(12) United States Patent
Taslimi et al.

(10) Patent No.: US 10,467,656 B2
(45) Date of Patent: Nov. 5, 2019

(54) ONLINE TO OFFLINE COMMERCE MERCHANT ADVERTISING

(71) Applicants: Ali Taslimi, Danville, CA (US); Fazel Taslimi, Danville, CA (US)

(72) Inventors: Ali Taslimi, Danville, CA (US); Fazel Taslimi, Danville, CA (US)

(*) Notice: Subject to any disclaimer, the term of this patent is extended or adjusted under 35 U.S.C. 154(b) by 548 days.

(21) Appl. No.: 14/810,248

(22) Filed: Jul. 27, 2015

(65) Prior Publication Data

US 2016/0027056 A1 Jan. 28, 2016

Related U.S. Application Data

(60) Provisional application No. 62/029,230, filed on Jul. 25, 2014.

(51) Int. Cl.
*G06Q 30/02* (2012.01)
*G06F 16/9537* (2019.01)
*G06F 16/907* (2019.01)

(52) U.S. Cl.
CPC ....... *G06Q 30/0261* (2013.01); *G06F 16/907* (2019.01); *G06F 16/9537* (2019.01); *G06Q 30/0246* (2013.01); *G06Q 30/0277* (2013.01)

(58) Field of Classification Search
CPC ........... G06Q 30/0261; G06Q 30/0246; G06Q 30/0277; G06F 16/9537; G06F 16/907
See application file for complete search history.

(56) References Cited

U.S. PATENT DOCUMENTS

| 6,026,375 A * | 2/2000 | Hall | G06Q 10/08 701/533 |
|---|---|---|---|
| 2011/0288917 A1* | 11/2011 | Wanek | G06Q 30/00 705/14.5 |
| 2014/0025470 A1* | 1/2014 | Berman | G06Q 30/0235 705/14.26 |
| 2014/0279040 A1* | 9/2014 | Kuboyama | G06Q 30/0269 705/14.66 |

* cited by examiner

*Primary Examiner* — Raquel Alvarez
(74) *Attorney, Agent, or Firm* — David R. Stevens; Stevens Law Group

(57) ABSTRACT

A system for merchant advertising can be utilized to enable merchants to dynamically advertise products and services to consumers based on the consumers' location, time, and/or intent and through the consumer's mobile or non-mobile computing device. Consumers can submit queries for products, services, and/or merchants via various search engine (s), search engine application(s), and/or merchant portal application(s) to indicate intent. An offer module can determine if a consumer's location is within a predetermined offer radius for merchant offers and if so, display the relevant merchants and merchant offers to the consumer. The offer module may display merchant offers that are currently active. Consumers wishing to redeem an offer may approach the merchant to complete the transaction. An analytics engine can track consumers' views, transactions, and other activity with respect to the merchants and offers.

19 Claims, 11 Drawing Sheets

ANALYTICS

| DISTANCE VIEWED | | DATE VIEWED | | CATEGORY VS DIRECT | | |
|---|---|---|---|---|---|---|
| DISTANCE (MI) | DIRECT (#) | DATE | DIRECT (#) | | TOTAL | % |
| 1 | 7 | 07/27/2015 | 1 | CATEGORY | 1 | 50 |
| 2 | 14 | 07/26/2015 | 17 | DIRECT | 1 | 50 |
| 3 | 16 | 07/25/2015 | 6 | | | |
| 4 | 5 | 07/24/2015 | 8 | | | |
| 5 | 9 | 07/23/2015 | 3 | | | |
| 6 | 11 | 07/22/2015 | 9 | | | |
| 7 | 3 | 07/21/2015 | 13 | | | |
| 8 | 4 | 07/20/2015 | 6 | | | |
| 9 | 3 | 07/19/2015 | 8 | | | |

*FIG. 9*

ONLINE TO OFFLINE COMMERCE MERCHANT ADVERTISING

CROSS-REFERENCE TO RELATED APPLICATIONS

This application claims the benefit of U.S. Provisional Patent Application Ser. No. 62/029,230, filed Jul. 25, 2014, and titled "Location Time Intent (LTI) E-Commerce Platform," the entire contents of which are hereby incorporated herein by reference.

BACKGROUND

As widespread use of mobile computing devices rapidly increases, merchants across virtually all industries continue to attempt to reach current and potential customers through various means via the mobile computing devices. One popular method includes location-based services ("LBS"). In general, LBS may be realized in software applications ("apps") that are installed on a mobile computing device and that recognize the user's particular location. The app can present particular advertisements, information, and/or offers based on proximity of the user to the merchant in order to drive and/or facilitate online to offline commerce transactions. As used herein, "online to offline commerce" may refer to communications and/or advertising over the Internet or other networks that lead consumers toward purchases at brick and mortar merchant locations.

Many mobile computing devices include location modules that employ GPS, cellular telephone signals, and other signals to locate the device and inform the app regarding the user's current location. Types of mobile computing devices may include, but are not limited to: smartphones, tablets, e-readers, wearable computing devices such as smart glasses and smartwatches, tablet computing devices, automobile-based or portable navigation devices, and other types of portable electronic computing devices. Types of non-mobile computing devices may include laptops and desktops.

In typical LBS applications, when a consumer initiates an online local search for products or services on a mobile or non-mobile computing device, the result is typically a static listing of local merchants relevant to the search terms (for example, "restaurant," "plumber," etc.) that have close physical proximity to the user's current location. In some cases, static advertisements are filtered and pushed to the consumer based on algorithms using previous behaviors or stored "opt in" information pertaining to the consumer. Some systems provide a map to the user to show the locations of merchants close to the user's current location.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 9 is an offer analytics page interface according to one embodiment of the present disclosure.

Figure 1:
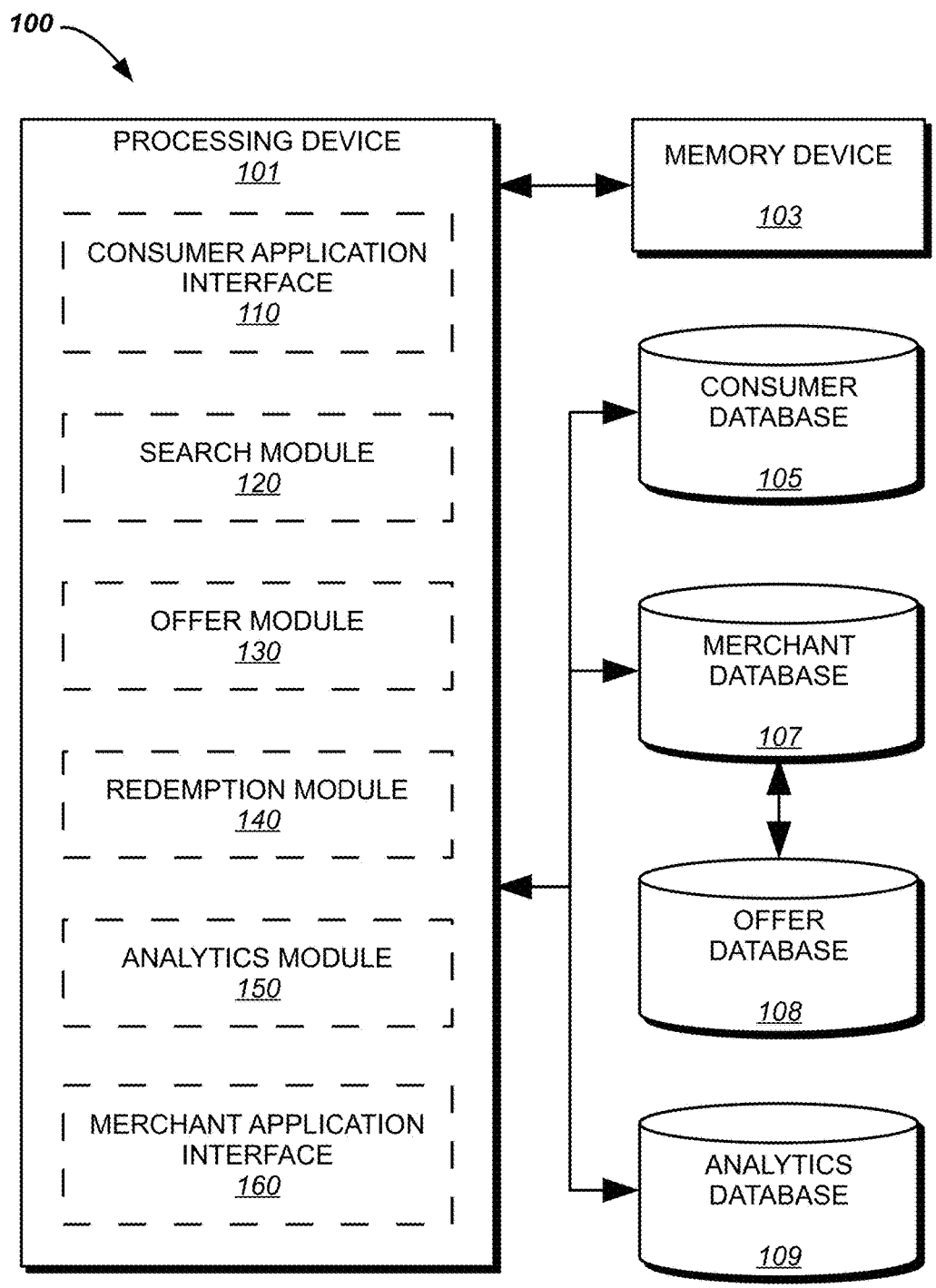
FIG. 1 is a block diagram illustrating a merchant portal system according to one embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for providing rule-based merchant advertising and offers that are specific to the location, time, and intent of the consumer. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

According to various embodiments of the present disclosure, systems and methods described herein can provide advertising and related services to consumers on behalf of one or more merchants. As used herein, a merchant may offer a product, service, or combination thereof to consumers. Such merchants may prefer to target consumers that are currently in close proximity to the merchant's location. Accordingly, embodiments of the present disclosure include location-based services ("LBS") to focus on consumers that are near a selected location. Further, embodiments of the present embodiment allow merchants to focus on consumers that have exhibited a particular intention, for example by identifying consumers that have searched for a particular product, service, and/or merchant, or have otherwise entered selected search terms in a search engine. Further, embodiments of the present disclosure can present advertisements, offers, and/or merchant information to consumers at predetermined select times. In this manner, a merchant may optimize a mobile-focused advertisement for particular location, time, and intent ("LTI") of consumers. In other embodiments, merchants may further focus on particular consumer demographic factors as desired.

FIG. 1 is a block diagram depicting a merchant portal system 100 according to one embodiment of the present disclosure. In this embodiment, portal system 100 includes a processing device 101 and memory device 103. In one embodiment, memory device 103 has computer-readable instructions to direct processing device 101 to implement an application interface 110, a search module 120, an offer module 130, a redemption module 140, analytics module 150, and merchant application interface 160. In the illustrated embodiment, merchant portal system 100 further includes consumer database 105, merchant database 107, offer database 108, and analytics database 109.

In one embodiment, consumer application interface 110 is adapted to interface with mobile and non-mobile computing devices of consumers. Embodiments of consumer application interface 110 generate content computer-readable instructions to present a user interface to a user of a computing device. Example user interfaces include a search query input interface, merchant listing, merchant offer listing, and merchant maps. In one embodiment, consumer application interface 110 is adapted to receive data from the consumer computing device such as current location data, a search query, and various selections made by the consumer including a selection of a merchant and selection of an offer. Consumer application interface 110 can transmit data received from the consumer computing device to search module 120, offer module 130, redemption module 140, analytics module 150 and/or merchant application interface 160.

Embodiments of consumer application interface 110 can query consumer database 105, merchant database 107, offer database 108, and/or analytics database 109 and transmit relevant information from said databases 105, 107, 108, and/or 109 to the consumer. In one embodiment, merchant portal system 100 is built under various types of search engines, including online to offline enabled commerce oriented search engines. Consumer application interface 110 can also transmit data to databases 105, 107 and/or 109 for adding said data.

In embodiments, search module 120 is adapted to receive a query submitted by a consumer via a consumer computing device, query merchant database 107 and/or offer database 108 for terms from the user query, and return relevant results to the consumer computing device that fit the circumstances of the query. The search results can comprise a list of merchants that offer products or services that match key terms of the search query or have a name or other indicia in common with search terms. Circumstances that may affect the relevancy of search results may include the consumer's current location or current merchant offers. Search module 120 can tailor user searches based on particular settings and preferences of each consumer. In embodiments, such settings and preferences are stored at consumer database 105. In one embodiment, search module 120 can order the search results by one of a variety of factors, including proximity of the merchant to the consumer, relevancy of the merchant to search terms, and relevancy of the products or services to the search terms. Search module 120 is adapted to transmit data regarding the consumer searches to consumer database 105 to store the data in a search history for that consumer. Search module 120 is further adapted to transmit data regarding the consumer searches and search results to analytics database 109 for tracking and/or subsequent reporting of search and/or viewing activity for selected merchants.

In embodiments, an offer module 130 is programmed to determine if an offer by a merchant may be applied to a consumer. As will be set forth in additional detail, a merchant may select particular criteria for an offer. If the conditions are met for a particular search, the offer may be displayed to the consumer. Offer module 130 is adapted to query offer database 108 for offers affiliated with merchants that result from a search query.

Offer module 130 can retrieve the offer conditions from offer database 108 for such offers and determine if the conditions are met by any particular consumer search. For example, in one example, a merchant may choose to make an offer available only between 1 pm and 3 pm. As another example, a merchant may choose to make an offer available only to certain demographic subsets. As another example, offers may be displayed only to consumers that are within a certain distance from the merchant location. Alternatively, an offer is associated with a location other than the merchant location or the merchant has multiple locations and an offer is associated with one or more of those locations. In such cases, offers may be displayed only to consumers that are within a certain distance from the location associated with that particular offer. This distance may be referred to herein as an "offer radius."

In embodiments, some merchants do not maintain a fixed location. For example, merchants such as food trucks, plumbers, or sales kiosks may travel to various locations throughout each day, week, and/or month. Such merchants may be referred to herein as "mobile merchants." In such cases, the merchant database may be continuously updated to reflect the latest known location of the mobile merchant so available offers may be identified for consumers that are within the offer radius based on current merchant locations. As consumers change their location, they may enter or exit the offer radii for various merchants and/or offers. Accordingly, offer module 130 can regularly and automatically update the available offers based on the consumers' new locations.

If the offer criteria are met, any applicable offers, including any relevant data regarding the offers, are transmitted to consumer application interface 110 for presentation on the consumer computing device. Offer module 130 is adapted to transmit data regarding the offers presented to a consumer to consumer database 105 to store that data in an offer history for that consumer. Offer module 130 is further adapted to transmit data regarding the presented offers to analytics database 109 for tracking of offers presented to and/or viewed by a consumer for subsequent reporting to merchants. Such data may include consumer selections and views of an offer.

In embodiments, a redemption module 140 is adapted to determine if an offer can be redeemed by a consumer to which the offer was presented. In embodiments, while an offer is presented only to consumers within an offer radius, an offer becomes redeemable only once the consumer is within a smaller distance from the merchant. This smaller distance may be referred to herein as a "redemption radius." Accordingly, redemption module 140 can determine from the location of the consumer computing device if the consumer is close enough to the merchant to redeem the offer. If so, redemption module 140 can receive a redemption code to be presented by the merchant to the consumer upon redemption of the offer. The redemption code may then be submitted to redemption module 140 to verify that the consumer redeemed the offer. In embodiments, redemption module 140 is configured to query merchant database 107 and offer database 108 for data regarding the merchant and merchant offers, including merchant location, offer conditions, redemption data, and other data relevant to redemption of an offer. Redemption module 140 is adapted to transmit data regarding the offers redeemed by a consumer to consumer database 105 to store that data in a redemption history for that consumer. Redemption module 140 is further adapted to transmit data regarding the redeemed offers to analytics database 109 for tracking of offers redeemed by a consumer for subsequent reporting to merchants.

In embodiments, analytics module 150 is adapted to aggregate statistics regarding consumers' interactions with merchant portal system 100 and report the statistics to merchants. Numerous dimensions of such data may be collected to measure and track the effectiveness of offer campaigns created by merchants. Data may include demographic factors of consumers, circumstances surrounding consumer searching, viewing of offers, and/or redemption of offers, and other data that may be of interest to merchants. Analytics module 150 can record such data at analytics database 109.

In embodiments, merchant application interface 160 is programmed to provide merchants with an interface to enter information related to the merchant, products and/or services, and offers. In embodiments, merchants subscribe to gain access to merchant portal system 100 and its associated services. In embodiments, merchants can access merchant application interface 160 via a mobile computer device. In other embodiments, merchants may access merchant application interface 160 on other types of computing devices, including a web browser on a personal computer.

One embodiment of merchant application interface 160 allows merchants to customize offers by selecting various input objects. As will be set forth in additional detail, a merchant may specify the availability of an offer, including restrictions based on time, location, and/or intent of consumers. Merchants may enter text, images, videos, audio, or other media regarding the merchant and/or merchant offers via merchant application interface 160. Such media regarding the merchant may be stored at merchant database 107, while data regarding offers may be stored at offer database 108. Embodiments of merchant application interface 160 may be connected with a password-protected account so that only authorized agents of the merchant can modify information concerning the merchant or its products, services, and/or offers.

In one embodiment, analytics may be presented to a merchant via merchant application interface 160. Such analytics may include consumer view counts and/or selections of the merchant in search query results, selection and/or views of an offer, and redemptions of an offer.

In embodiments, consumer database 105 includes data regarding each consumer including previous interactions between consumer and merchant portal system 100. Such interactions may include search history, offer views, offer redemptions, demographic information, and other information culled from consumers' social media profiles, shopping histories, and other accessible information relevant to the consumer.

In embodiments, merchant database 107 includes data regarding merchants in merchant portal system 100. Such information may be submitted by each merchant or gathered from other sources, including public-facing merchant websites or other marketing channels. Data in merchant database 107 may include information regarding both merchants that are subscribers to merchant portal system 100 and merchants that are not. In one embodiment of the present disclosure, merchant database 107 includes text descriptions, images, video, and other media depicting each merchant. In embodiments, such media may be submitted by a merchant via merchant application interface 160.

In embodiments, offer database 108 includes data regarding offers that a merchant submits to merchant portal system 100. As a merchant creates each offer and/or edits the offer settings, offer database 108 can be updated to reflect the current settings of each offer. Embodiments of offer database 108 can include text descriptions, images, video, and other media regarding each offer. In embodiments, such media regarding each offer may be submitted by a merchant via merchant application interface 160.

In embodiments, analytics database 109 includes statistics regarding consumers' interactions with merchant portal system 100 captured by analytics module 150. Statistics may include offer view counts, merchant view counts, offer redemptions, consumer demographic information, transactions, and other similar data. In one embodiment, analytics database 109 is configured to aggregate data from consumer database 106, merchant database 107, and offer database 108.

Figure 2:
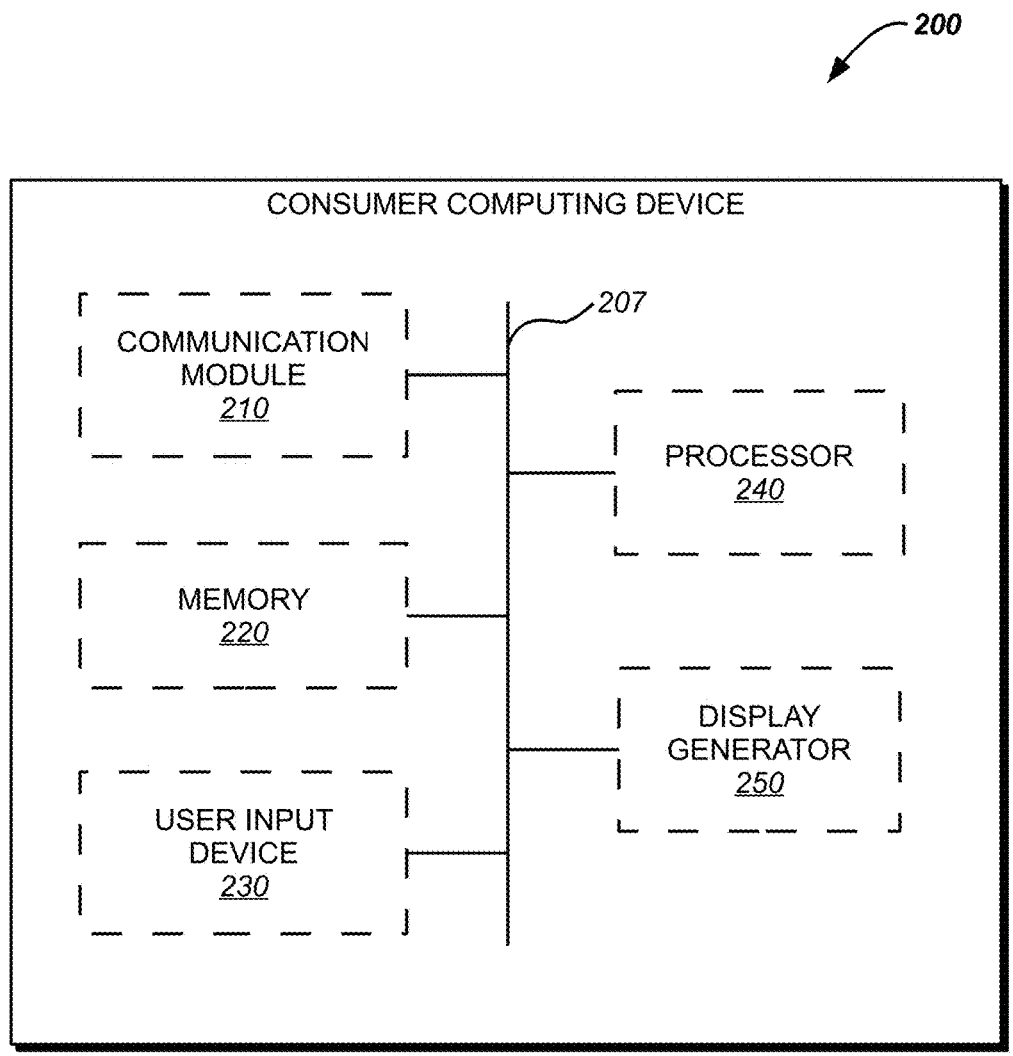
FIG. 2 is a block diagram illustrating a consumer computing device according to one embodiment of the present disclosure.

Referring to FIG. 2, one embodiment of a consumer computing device 200 is depicted. Consumer computing device 200 comprises communication module 210, memory 220, user input device 230, processor 240, and display generator 250. In embodiments of the present disclosure, communication between modules 220, 230, 240, 250 and merchant portal system 100 may be facilitated by communication module 210. A data communication bus 207 allows the various systems, modules, and components of device 200 to communicate with one another.

Figure 3:
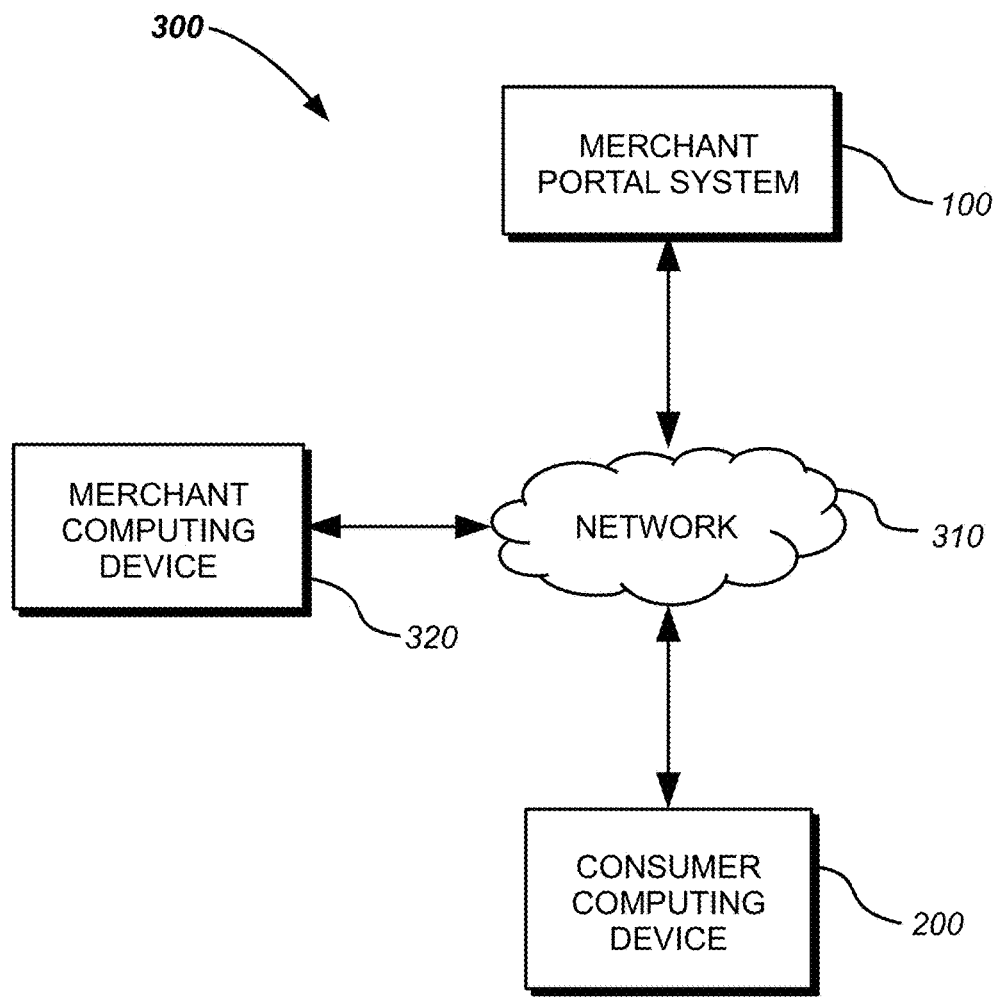
FIG. 3 is a schematic illustrating a merchant portal network according to one embodiment of the present disclosure.

Referring to FIG. 3, an embodiment of merchant portal network 300 is depicted. As shown, merchant portal system 100 communicates with consumer computing device 200 and merchant computing device 320 via network 310. In embodiments, network 310 comprises various forms including, but not limited to, a wireless network, a cellular network, an intranet, the Internet, or combinations thereof.

According to various embodiments, the foregoing components and/or modules may be embodied as computer-readable instructions stored on various types of media. Any combination of one or more computer-usable or computer-readable media may be utilized in various embodiments of the present disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

In operation, embodiments of the present disclosure are configured to provide to consumers merchant offers that are specific to the location, time, and intent of the consumer. According to embodiments, the intent of a consumer may be demonstrated by a variety of signals including, but not limited to: current and/or previous search queries, demographic factors, previous transactions, user preferences or settings, and previous offer redemptions.

Figure 4:
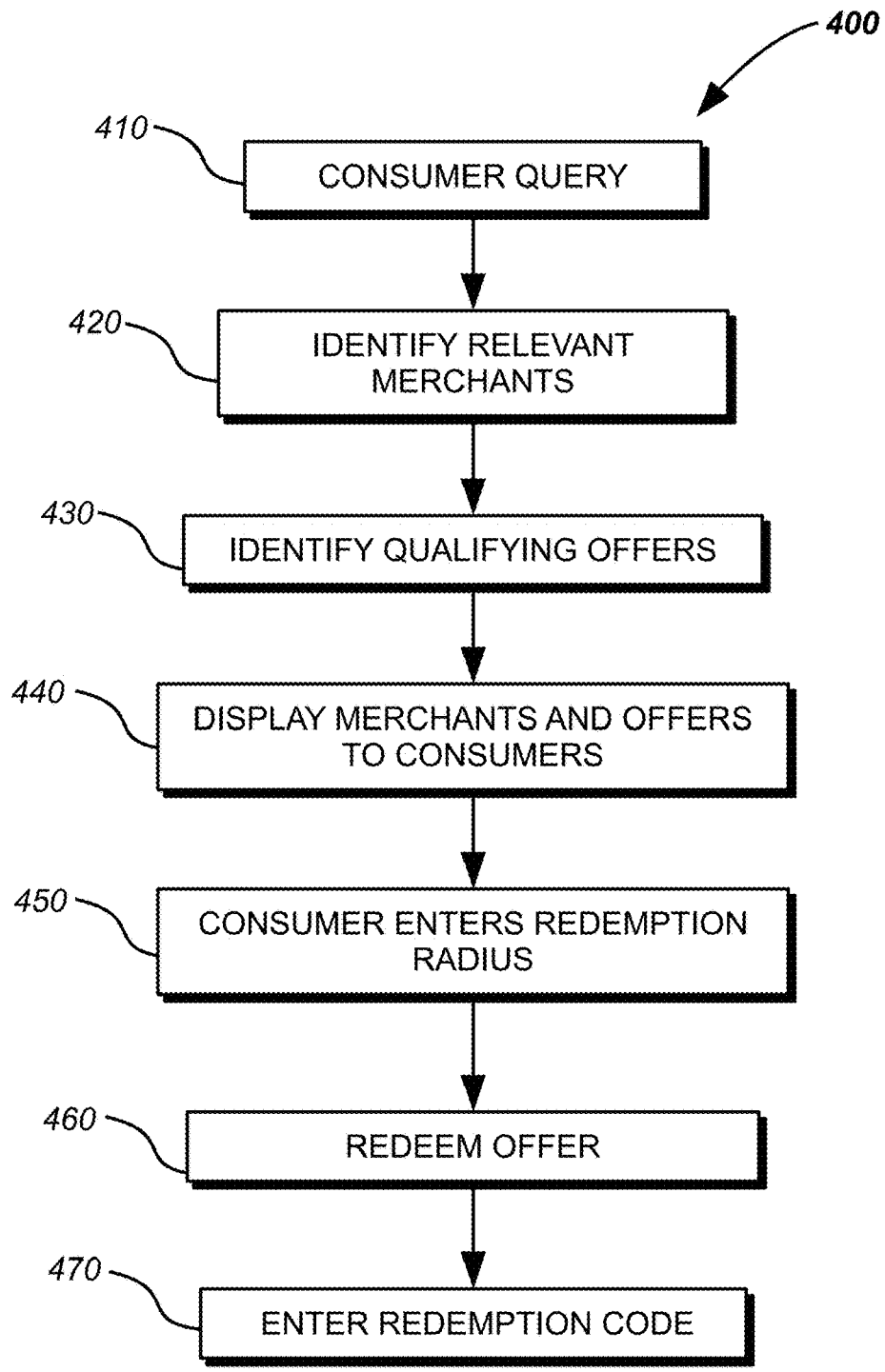
FIG. 4 is a flow diagram illustrating a merchant advertising method according to one embodiment of the present disclosure.

Referring to FIG. 4, a method 400 for providing consumer offers is set forth according to one embodiment of the present disclosure. Method 400 includes operation 410, where a consumer submits a search query on a search engine. In embodiments, the search query includes search terms that are relevant to a product or service in which the consumer is interested. In other embodiments, the search query includes search terms that are relevant to a merchant, such as the name of the merchant. In other embodiments, the search query includes search terms that are relevant to a category of merchants. For example, a consumer may enter the search terms "Italian food" into the search query.

At operation 420, the search module identifies merchants that fit the search query. In embodiments, the merchants are ranked according to their respective relevancy to the submitted search terms. According to various embodiments, merchants may be identified and/or ranked according to physical proximity of the consumer to the merchant location, relevancy to the merchant category included in the search query, similarity of the merchant name to the search query, and similarity of the product or service offerings to the search query. In other embodiments, merchants may be identified and/or ranked for each search query according to means known in the art or not yet known in the art.

At operation 430, the offer module identifies offers that correspond to the merchants identified at operation 420 and for which the consumer meets predetermined offer criteria. In embodiments, said offer criteria includes a selected location, a selected time, and a selected intent. In one embodiment, the merchant can set the offer qualification criteria to meet specific marketing objectives. In one example, a merchant may have discovered that potential consumers of a particular age group are more likely to purchase products from the merchant. To take advantage of this discovery, the merchant can input an offer the age group as a criterion for that offer. In another example, a merchant desired to increase sales activity on Tuesday afternoon from 2 pm-4 pm. To reach this objective, the merchant can input this time window as a criterion of an offer that incentivizes consumers to purchase from the merchant during those hours. In another example, a merchant may desire to target consumers that have previously redeemed an offer for the merchant or for a merchant in a related field. Accordingly, the merchant can input the consumer's offer redemption history as a criterion for the offer. In embodiments, the relative locations of the merchant and the consumer are considered for the consumer. In one embodiment, an offer is not identified if the consumer is not within the offer radius. The offer radius may be a value that is common amongst all offers on merchant portal system 100, or may be selected according to each merchant or according to each offer. Examples of an offer radius include 1 mile, 2 mile, and 3 miles.

A common marketing objective of merchants may be to advertise to consumes that are looking for the products that the merchant offers for sale. To realize this objective, merchants may select, as a criterion of an offer, that the search query of the consumer match particular products and/or services offered for sale by the merchant.

At operation 440, the merchants that have been identified as relevant at operation 420 are transmitted to the consumer computing device and displayed to the consumer. The merchants may be displayed in list form, map form, or in other visual arrangement. In embodiments, qualifying merchant offers are displayed to the consumer. In one embodiment, a graphic that represents an offer is generated on the consumer user interface, where the consumer understands that by selecting the symbol object on the interface, information regarding the offer will be provided. In one embodiment, a map showing the an area around the consumer's present location is displayed on the consumer computing device, with symbols on the map representing the locations of merchants and/or offers in their respective locations.

If a consumer is interested in an offer, she may want to know more information about the merchant proposing the offer or the offer itself. Thus, in one embodiment, the consumer may select a merchant, for example by tapping the merchant name on a mobile device display or clicking on the merchant name by using a computer mouse, and the consumer user interface may then present additional information regarding the merchant and current offers available to the consumer. In embodiments, if the consumer wants to know information about any available offers, she may select the offer and the consumer user interface may then present additional regarding the selected offer. In embodiments, information about the merchant and/or the offer may include location information and in particular directions from the current location of the consumer to the merchant location. In one embodiment, a button interface object can be displayed for each available offer that says "REDEEM OFFER." By selecting this button object, the consumer may receive additional information regarding the offer or incentive to redeem the offer. For example, in one embodiment, a countdown timer is displayed that reinforces to the consumer that the offer is time-limited.

At operation 450, if a consumer chooses to redeem an offer that was displayed at operation 440, he can travel toward the merchant location. When the consumer has entered the redemption radius of the merchant location, the offer may become redeemable. An alert may be displayed to the consumer on the consumer computing device to notify the consumer of the redeemable offer. In one embodiment, the redemption radius comprises a value that is common amongst all offers on merchant portal system 100. In other embodiments, the redemption radius may be selected according to each merchant or according to each offer. Examples of a redemption radius include 600 feet, 500 feet, 400 feet, and 300 feet.

At operation 460, The consumer may then approach an agent or employee of the merchant to redeem the offer. At operation 470, upon redemption of the offer, the consumer may receive a redemption code from the merchant. In embodiments, the consumer computing device can display a redemption code field to the consumer while the consumer is within the redemption radius or otherwise in close proximity to the merchant. The consumer can enter the redemption code into the consumer computing device, which acts as verification that the offer was redeemed and the process 400 is complete. In alternative embodiments, a redemption code may be entered by various means, including scanning a QR code or other similar visual indicator of the offer. In other embodiments, a wireless signal such as Wi-Fi or near field communication ("NFC") indicates to redemption module that the offer was redeemed.

According to some embodiments of the present disclosure, prior to the consumer paying the merchant, the consumer computing device can recommend to the consumer one or more credit cards to use to make the payment in order for the consumer to earn and/or accumulate credit card reward points. In some cases, a credit card provider increases the amount of credit card reward points based on the category of the merchant. Further, such credit card reward incentives change at various times. Thus, the credit card recommendation may be based on the particular credit cards held by the consumer and the current credit card reward incentives that are currently active.

In embodiments, at each operation 410, 420, 430, 440, 450, 460, and/or 470, an analytics module can gather data regarding consumer actions and/or preferences to add at an analytics database.

Figure 5:
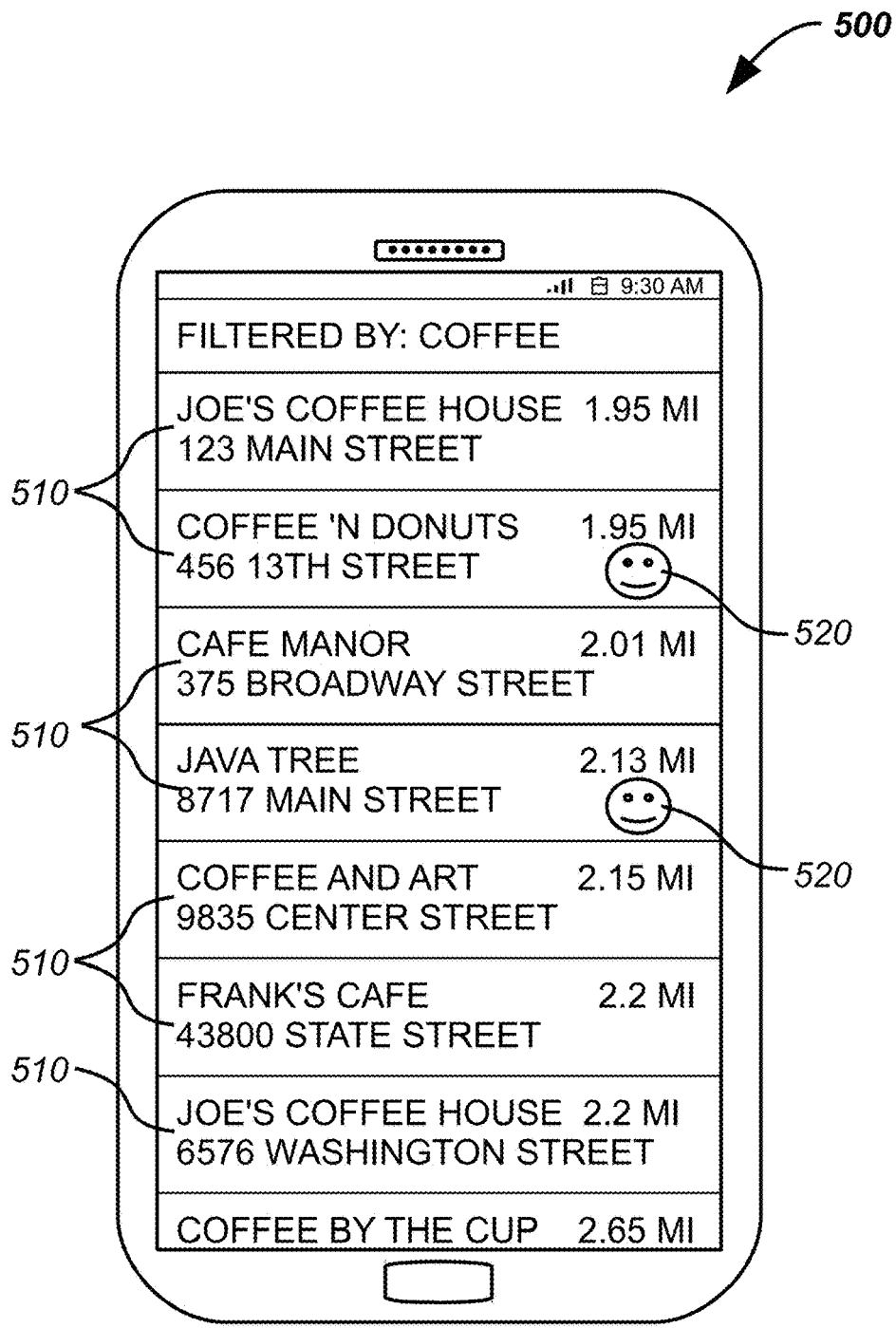
FIG. 5 is a merchant listing interface according to one embodiment of the present disclosure.

Referring to FIG. 5, an embodiment of a merchant listing 510 is depicted. A merchant listing 510 may be displayed on a consumer computing device 500 in response to a query for a merchant, product, and/or service. Merchant listing comprises several merchants 515 that were determined to be relevant to the consumer query and that have a nearby location. According to various embodiments, merchant listing 510 can include additional information and/or marketing materials regarding the merchant. Media regarding the merchant, including images and video, may likewise be available for viewing by the consumer. As depicted in FIG. 5, an offer graphic 520 is present on an merchant listing 510 to indicate that there is an offer for which the consumer meets the offer criteria. The offer graphic 520 may include a static image, a flashing icon, or other graphical feature optimized to capture the attention of the consumer.

Figure 6:
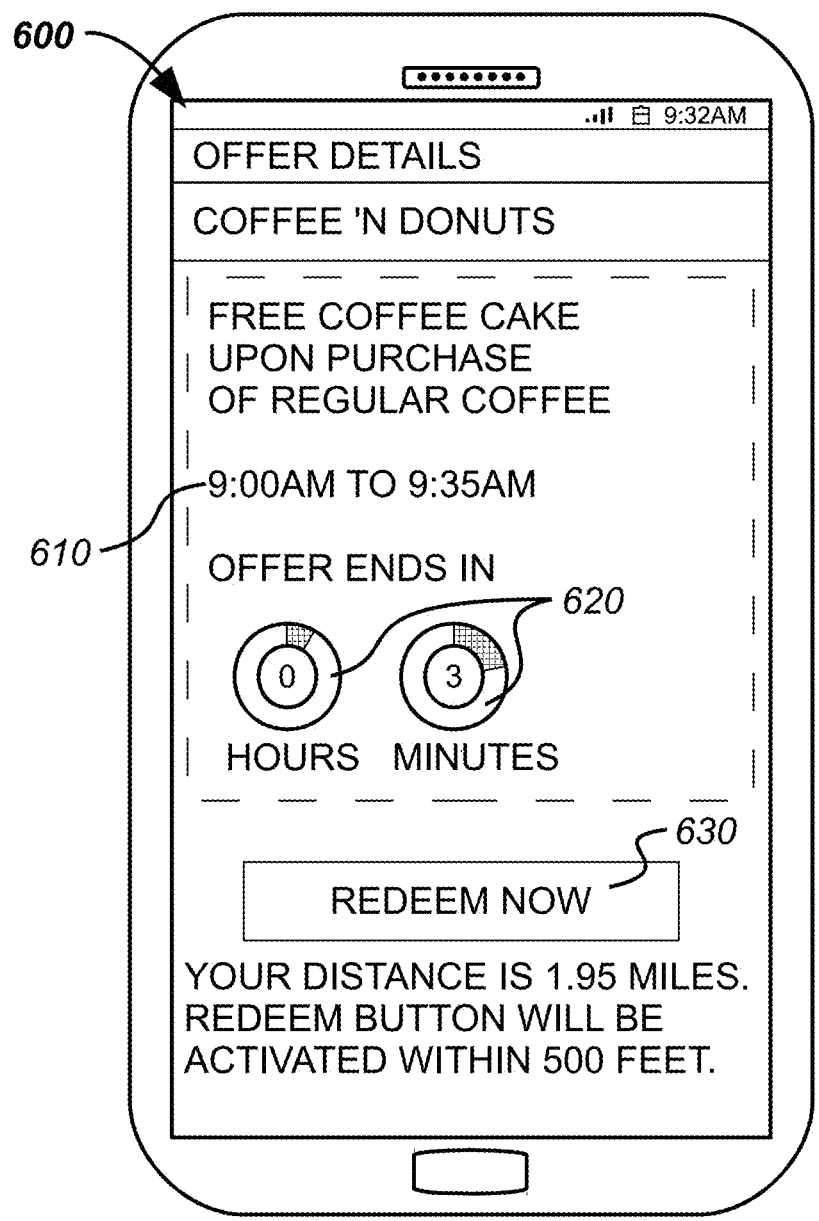
FIG. 6 is an offer detail page interface according to one embodiment of the present disclosure.

If the consumer selects the offer graphic 520, the consumer user interface may present details regarding the offer. Referring now to FIG. 6, an offer detail page 600 is depicted according to one embodiment of the present disclosure. As depicted in FIG. 6, the offer is described in offer detail page 600 as "FREE COFFEE CAKE UPON PURCHASE OF REGULAR COFFEE" and an associated time frame 610 is indicated. As would be apparent to a person of ordinary skill in the art having the benefit of this disclosure, any particular offer can be customized according to the merchant's particular preferences and for the merchant's industry. The offer may reflect any one of numerous traditional paper coupon offers that are pervasive in the retail industry.

Embodiments of the present disclosure can make recommendations to the merchant as to what offers may have a higher probability of success and attract the most consumers. In embodiments, the system can take into account multiple variables such as the consumer's past history, search pattern, weather conditions, traffic conditions, time of the day, day of the week, month of the year, proximity of the consumer location to merchant location, offers from other similar businesses, demographic factors, marital status, and other known factors.

Figure 6A:
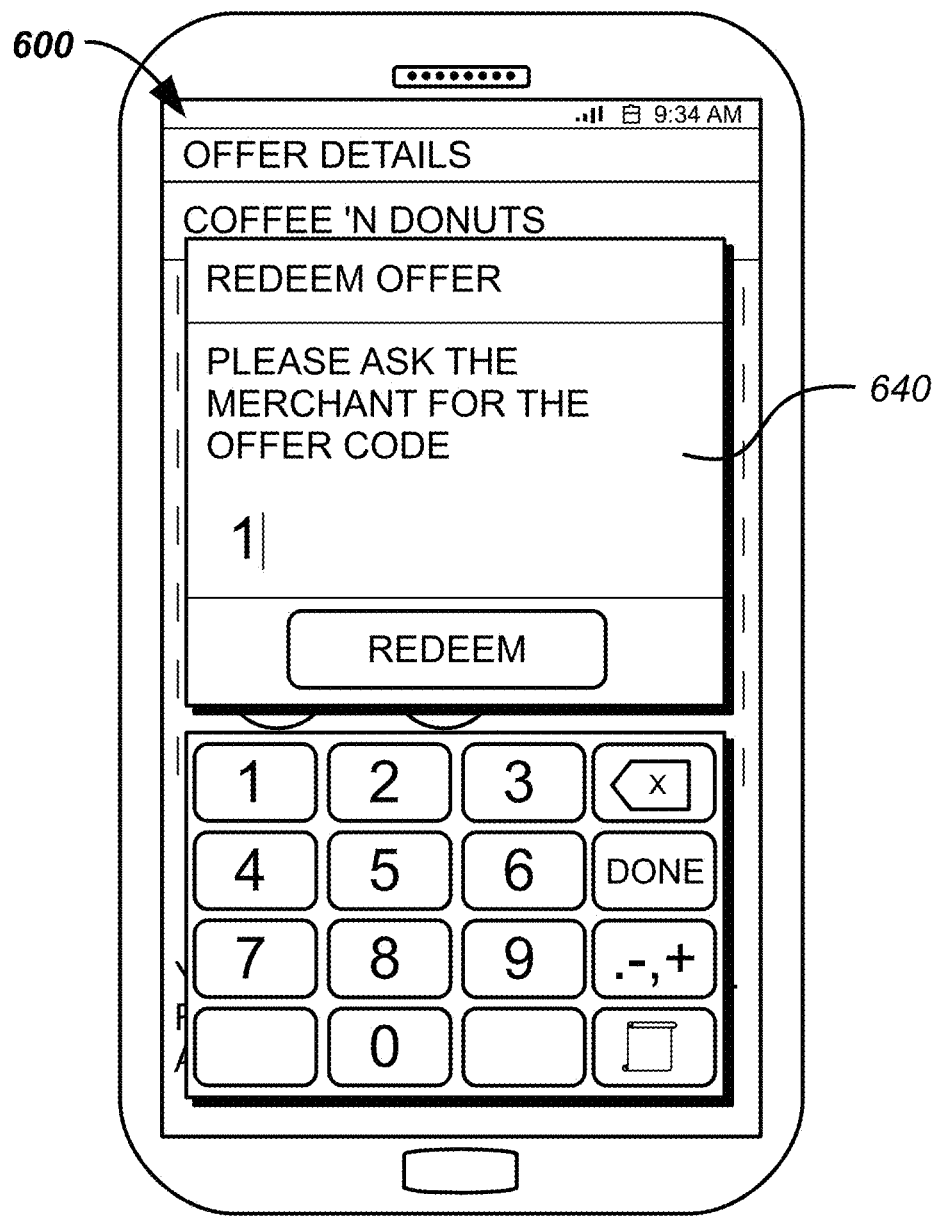
FIG. 6A is an offer redemption window according to one embodiment of the present disclosure.

As depicted in FIG. 6, a countdown timer 620 is presented. Countdown timer 620 may be an animated graphical object that gradually changes to show how much time is left before the offer will expire. FIG. 6 further shows a "REDEEM NOW" button object 630. In one embodiment, a consumer may select button object 630 once the consumer has entered the redemption radius. In one embodiment, selecting button object 630 can pause or extend the timer for the consumer to be able to redeem the offer. Referring to FIG. 6A, upon selecting "REDEEM NOW" button object 630, the consumer is presented with a "REDEEM OFFER" window 640, where the redemption code may be entered upon receiving it from the merchant. In embodiments, the merchant may provide the redemption code upon completion of a transaction that is part of the offer redemption. Upon entering the redemption code to "REDEEM OFFER" window 640 and submitting, the offer redemption may be recorded at a consumer database and/or an analytics database.

Embodiments of the present disclosure provide a merchant back end interface to allow merchants to enter information regarding the merchant, create offers, make selections regarding the offers, and otherwise administrate the merchant listing. The merchant back end interface may further provide analytics to the merchant regarding viewing activity of the merchant, offer redemption activity, and other data regarding consumer interactions with the merchant via the merchant portal system. According to various embodiments, merchant back end interface comprises authentication In embodiments, a merchant back end interface can enable the merchant administrator to manage of all the merchant's accounts. The merchant back end interface can allows an administration user to log in and manage multiple user accounts. In such embodiments, the administration user may monitor the analytics within the particular geographic regions (i.e., country, state, or city) and specific locations (such as a selected neighborhood) and on a per merchant basis. The administration user can be allowed to add, modify, and/or delete offers on behalf of each individual merchant. The administration user may group multiple merchant locations and send the same offer for all or some of them.

In one embodiment, the merchant portal system back end can interface with backend systems of merchants and corporations for the administration of merchant accounts. For example, the merchant portal system back end can receive commands from a merchant's inventory system, payroll system, and other like systems to modify the merchant account. In one particular example, a merchant's payroll or other type of employee management system can send a command to direct the merchant portal system to add a newly hired employ as an authorized account holder to log in, place advertisements and/or offers, and the like. Likewise, if an employee is terminated from a merchant, the employee management system can send a command to direct the merchant portal system to remove the terminated employ as an authorized account holder. In another particular example, a merchant inventory system can send a command to direct the merchant portal system to create offers for selected products and/or services that have inventory levels above a threshold. In such an example, offers for overstocked products and/or services can be automatically managed by the merchant inventory system.

Figure 7:
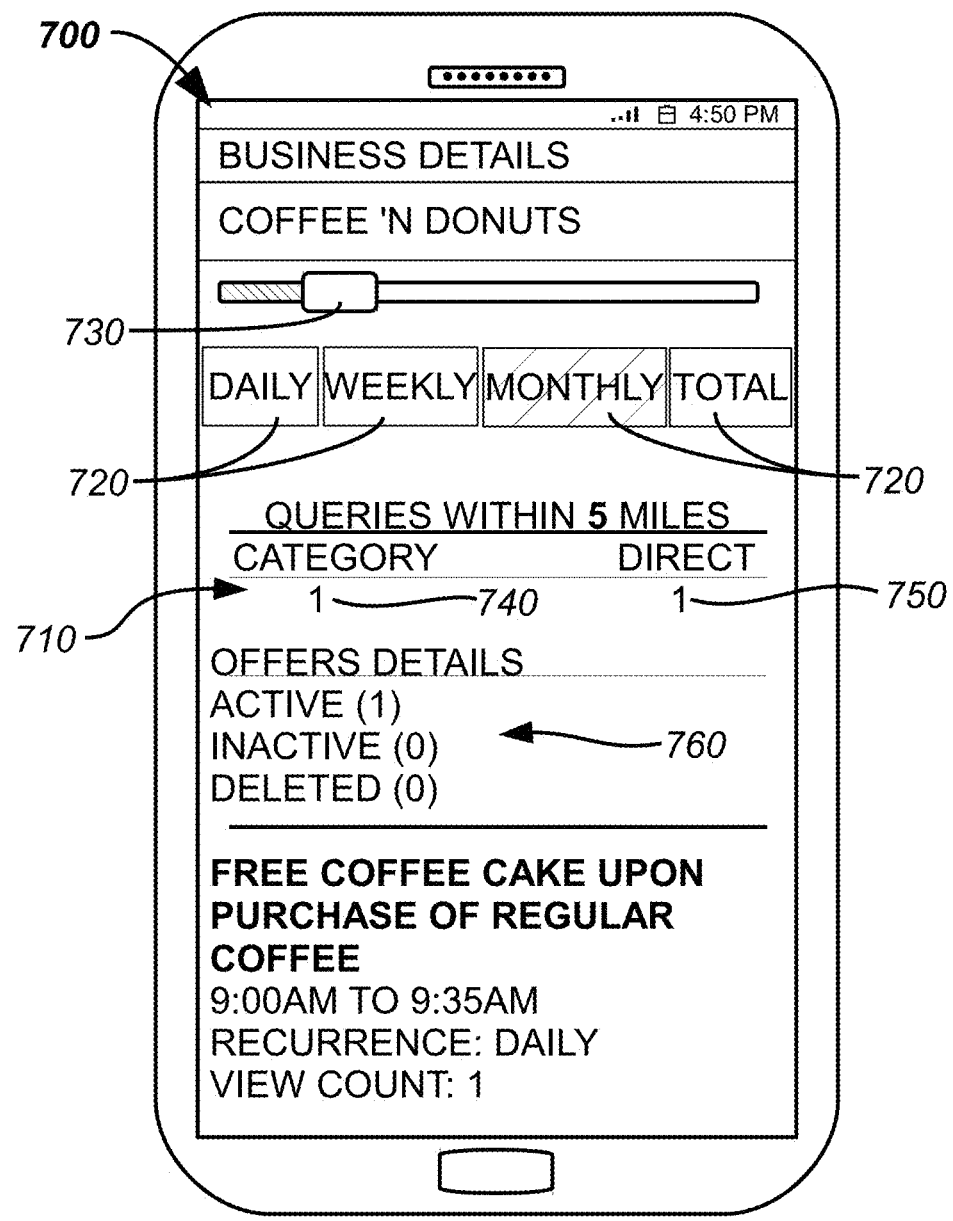
FIG. 7 is a business details page according to one embodiment of the present disclosure.

Referring to FIG. 7, a business details page 700 is presented according to one embodiment of the present disclosure. Basic search query analytics 710 is presented to the merchant according to the timescale selected by time selection object buttons 730 and according to the distance from the merchant selected by time slider object 730. For example, the analytics presented in the example depicted in FIG. 7 reflect activity that occurred within five miles of the merchant location. By adjusting the slider object 730, a merchant may view analytics for activity that occurred within that selected distance. In one embodiment, the statistic 740 under the heading "CATEGORY" indicates the number of consumers that searched the category of the merchant (which, in this example, is "coffee" or like terms). In one embodiment, the statistic 750 under the heading "DIRECT" indicates how many consumers selected for that particular merchant by name. In embodiments, the analytics for view counts only counts one view per consumer session so that multiple views by the same consumer during the same session. In one embodiment, a session on a mobile device may end when the consumer closes down the application. In another embodiment, a session on a browser-based application may end when the browser window is closed. Embodiments of the present disclosure include compensating the view count to prevent artificially high view count numbers, for example by detecting if a user has started multiple sessions within a relatively short time frame.

In embodiments, "OFFERS DETAILS" section 760 includes summary information regarding active, inactive, and/or deleted offers. In one embodiment, an active offer comprises a valid offer at the current time in the time zone of the merchant. Active offers may be available to consumers for which the offer criteria are met. In embodiments, an inactive offer comprises a nonvalid offer at the current time in the time zone of the merchant. Inactive offers may be not visible to consumers. In embodiments, an expired offer comprises an offer that has reached a maximum redemption limit and/or has ended. Expired offers may be not visible to consumers. In embodiments, a deleted offer comprises an offer that was deleted by the merchant. Deleted offers may be not visible to consumers.

Figure 8:
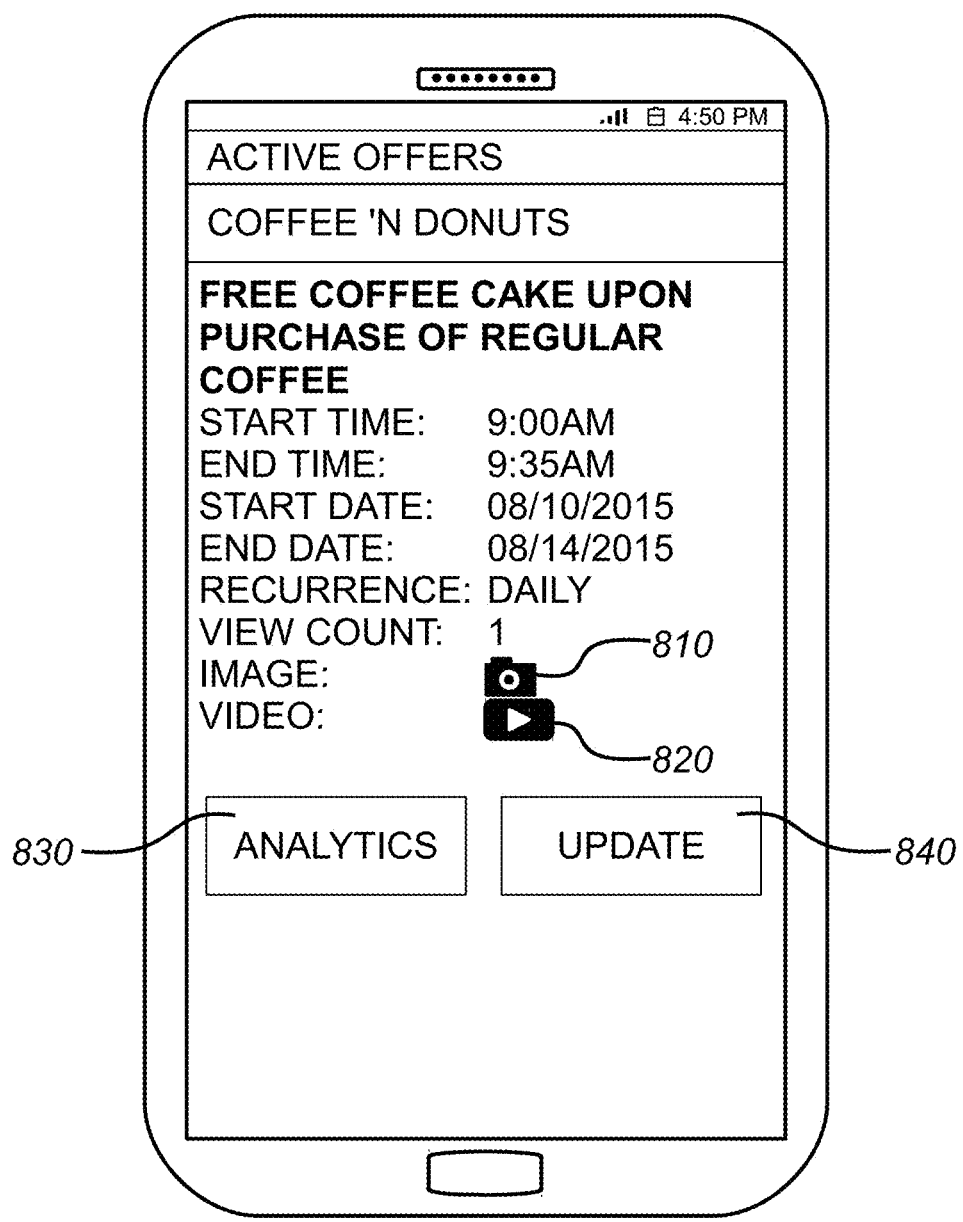
FIG. 8 is an active offers interface according to one embodiment of the present disclosure.

In one embodiment, selection of an offer listed in "OFFERS DETAILS" section 760 leads merchant back end interface to display further details and options regarding the selected offer. Referring now to FIG. 8, information regarding an offer is presented. Such information includes based information related to the operation of the offer such as "START TIME," "VIEW COUNT," and the like. The information regarding the offer includes options to view and/or edit images or video by selection of object 810 or object 820, respectively. In one embodiment, selection of the "ANALYTICS" button 820 directs merchant back end interface to display additional analytics regarding the currently-selected offer. In one embodiment, selection of the "UPDATE" button 830 directs merchant back end interface to display input fields and other selections to modify the currently-selected offer.

Referring to FIG. 9, an example of analytics is set forth. Data presented includes "DISTANCE VIEWED," which summarizes the view count for the offer where the consumer was roughly at the distance indicated from the merchant location. Data presented includes "DATE VIEWED," which displays a day-by-day view count for the offer. Data presented includes "CATEGORY VS DIRECT," which indicates the search queries that consumers entered to find the offer. In embodiments, additional analytics may be presented to the merchant. Further, the analytics may be presented in various formats including bar charts, pie charts, line graphs, and data tables.

Figure 10:
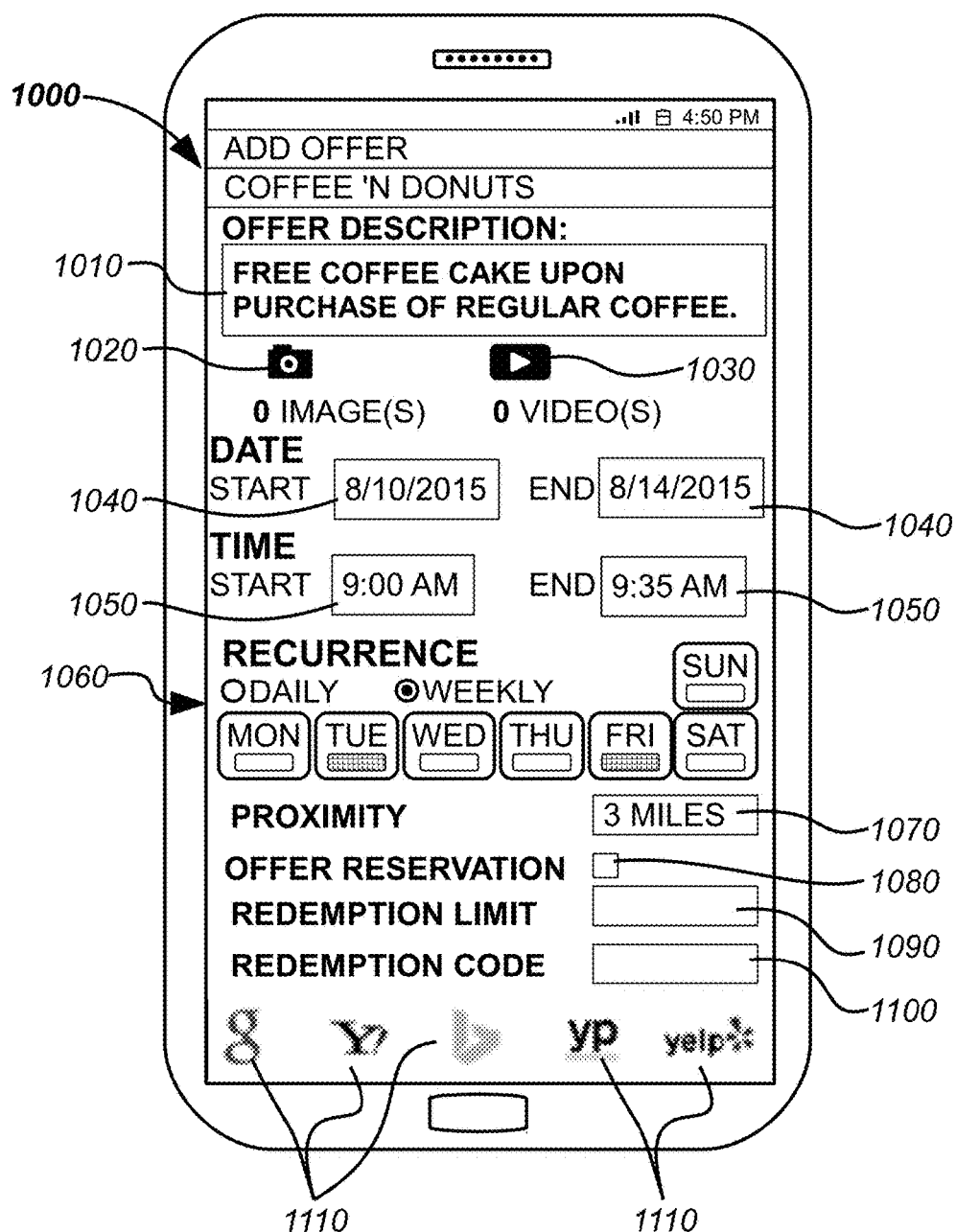
FIG. 10 is an offer edit interface according to one embodiment of the present disclosure.

Referring now to FIG. 10, an "ADD OFFER" interface 1000 is depicted according to one embodiment of the present disclosure. At this interface 1000, the merchant may specify various criteria for an offer and media to be presented with an offer, including text description 1010, images 1020, and video 1030. The merchant may specify start and end dates and times through datepickers 1040 and timepickers 1050. The merchant may also specify recurrence options 1060 to repeat the offer on additional days. In one embodiment, the merchant can select the select offer radius by entering it at input field 1070. The merchant may further specify "OFFER RESERVATION" 1080, which can act as a grace period to allow consumers to redeem an offer after the offer expiration if the consumer selected a "Redeem Offer" button object before the offer expired. The merchant may optionally enter a redemption limit at field 1090, or a redemption code at field 1100. In embodiments, a redemption code is a 4 character alpha numeric code or similar key that the merchant will share with the consumer at the time of offer redemption. In embodiments, merchant can select in which search engine(s), search engine application(s), and/or merchant portal application(s) the offer may appear by matching the unique merchant identifier at each search engine with the system. The merchant may select one of the available search engine(s), search engine application(s), and/or merchant portal application(s) by selecting icons 1110.

In various embodiments, social media can be used to enhance the advertising effect of the offers. In one embodiment, a merchant can select which social media sites to which the offer will be posted. In another embodiment, the merchant can select to have the offer display on the merchant's website by interfacing an API. In various embodiments, analytics displayed to the merchant can include ratings, reviews, social shares, and views on social networks.

According to embodiments, a consumer's particular preferences may be stored at a consumer database. In one embodiment, consumers can input preferred categories and/or products/services (e.g., Chinese restaurants) and offers pertaining to those preferences may be displayed for the consumer's location. The consumer can further specify time frames to receive ads, offers, and/or notifications of same. For example, the consumer could enter her preferred categories and the hours and/or days she is willing to accept offers.

Embodiments of the present disclosure can collect data from social networks to enhance analytics data. Demographic factors, age, and gender can be added to analytic filters for more granular analysis. In one embodiment, a special birthday offer can be sent to a consumer.

In one embodiment, if a consumer uses a Facebook account to sign in to the merchant advertising platform via the Facebook Platform, the merchant advertising platform can associate a unique International Mobile Station Equipment Identity ("IMEI") of the consumer's phone with anonymized profile data from the consumer's Facebook profile, and subsequently transmit customized offers based on that profile data to the particular phone. Additionally, the IMEI may be tracked for behavioral advertisement purposes. Further, data collected via the merchant advertising platform and associated with an IMEI may be used for banner ads in different apps (e.g., games).

In embodiments, offer module may display upcoming offers to consumers. For example, a notification may be sent to a consumer mobile computing device up to one day in advance of the offer start time. In one embodiment, the merchant may select whether upcoming offers are displayed to the consumer. In one embodiment, each consumer can enter a preference regarding whether he or she wants to see notifications for future offers.

In embodiments, the offer module may enable consumers to rate the quality of various advertisements and/or offers, write reviews, and recommend and/or share advertisements and/or offers via social network platforms. One embodiment of the analytics module is able to collect analytics regarding shares of advertisements and/or offers by consumers on various social networking platforms. In some embodiments, the analytics module can track views and/or clicks of the advertisements and/or offers on each social networking platform.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for providing offers to a consumer, comprising:

receiving, from a consumer computing device, a first location data of a consumer;

receiving, from the consumer computing device, a user purchase intent signal, the user purchase intent signal comprising at least one of: a user-submitted preference, a demographic factor, a user birthday, and a previous offer redemption;

receiving, from the consumer computing device, a search query for products or services;

querying, at a computer search module, the search query for products or services and the user purchase intent signal to a merchant database to identify a relevant merchant;

receiving, from the merchant, a selection of a search query timescale and a search query distance, said distance being a distance from the merchant;

transmitting, to the merchant, search query analytics according to the selected search query timescale and search query distance for a category of the merchant, said search query analytics including an offer view count and an offer redemption count;

comparing, at an offer computer module, the first location data of the consumer against location data of an offer, the location data of the offer comprising an offer radius;

comparing, at the offer computer module, the current time against a time window of the offer;

comparing, at the offer computer module, the user purchase intent signal against the offer;

identifying, at the offer computer module, a matching offer of the merchant that matches the location data of the consumer, the current time, and the user purchase intent signal;

transmitting, to the consumer computing device, a query result comprising an identity of the merchant with the matching offer;

receiving, from a consumer computing device, a second location data of a consumer;

comparing, at the offer computer module, the second location data of the consumer against a redemption radius of the offer;

restricting the consumer from redeeming the matching offer while the second location data indicates that the consumer is not within the redemption radius of the offer;

receiving, at a redemption computer module, a selection by the consumer to redeem the matching offer;

receiving, at the redemption computer module, a redemption confirmation for the consumer indicating that the consumer redeemed the matching offer.

2. The method claim 1, wherein comparing the first location data of the consumer against location data of the merchant further comprises determining if the consumer is within the offer radius for the offer.

3. The method claim 1, further comprising receiving the offer radius as a selection from the merchant.

4. The method claim 1, further comprising:
receiving, from the merchant, an offer description and
receiving, from the merchant, an offer start time and an offer expiration time.

5. The method claim 4, wherein identifying the matching offer of the merchant further comprises determining if the current time is within the offer start time and the offer expiration time.

6. The method claim 4, further comprising displaying, at the consumer computing device, a countdown reflecting time remaining from the current time until the offer expiration time.

7. The method claim 1, further comprising:
receiving, from the merchant, a multimedia asset depicting a product offered for sale and transmitting, to the consumer computing device, the multimedia asset.

8. The method claim 1, further comprising determining if the consumer is within the redemption radius.

9. The method claim 8, further comprising: if the consumer is within the redemption radius, displaying, at the consumer computing device, a redemption code entry field.

10. The method of claim 1, wherein the merchant comprises a mobile merchant.

11. The method of claim 1, further comprising receiving, from the merchant, multiple merchant locations.

12. A computer-implemented method for merchant advertising, comprising:
at a merchant portal back end, receiving an offer description, an offer start time, and an offer expiration time from a merchant;
at the merchant portal back end, receiving an offer location;
at the merchant portal back end, receiving an offer radius value as a selection from the merchant;
at the merchant portal back end, receiving a redemption radius value as a selection from the merchant;
at a search module, receiving a consumer query for products or services and a consumer purchase intent signal, the consumer purchase intent signal comprising at least one of: a user-submitted preference, a demographic factor, a user birthday, and a previous offer redemption;
at the search module, determining if the consumer query for products or services and the consumer purchase intent signal match the offer description;
receiving, at the merchant portal back end, a selection of a search query timescale and a search query distance, said distance being a distance from the merchant;
transmitting, to the merchant, search query analytics according to the selected search query timescale and search query distance for a category of the merchant, said search query analytics including an offer view count and an offer redemption count;
at an offer module, receiving a consumer location;
at the offer module, determining if the consumer location is within the offer radius value of the offer location;
if the consumer location is within the offer radius value of the offer location and if the consumer query for products or services and the consumer purchase intent signal match the offer description and if a current time is within the offer start time and the offer expiration time, transmitting the offer description to a consumer computing device for display to the consumer;
restricting the consumer from redeeming the offer while the consumer location is not within the redemption radius value of the offer location.

13. The method of claim 12, further comprising displaying, at the consumer computing device, a countdown reflecting time remaining from the current time until the offer expiration time.

14. The method of claim 12, further comprising:
receiving, from the merchant, a multimedia asset depicting a product offered for sale and
transmitting, to the consumer computing device, the multimedia asset.

15. The method of claim 12, further comprising:
at the offer module, receiving a second consumer location;
determining if the second consumer location is within the redemption radius value.

16. The method of claim 15, further comprising: if the second consumer location is within the redemption radius value, displaying, at the consumer computing device, a redemption code entry field.

17. The method of claim 12, wherein the merchant comprises a mobile merchant.

18. The method of claim 12 further comprising receiving, from the merchant, multiple merchant locations.

19. A computer system for merchant advertising comprising:
a merchant portal computer device comprising a memory and a processing device, the memory storing computer-readable instructions directing the processing device to:
receive, from a merchant, a selection of a search query timescale and a search query distance, said distance being a distance from the merchant;
transmit, to the merchant, search query analytics according to the selected search query timescale and search query distance for a category of the merchant, said search query analytics including an offer view count and an offer redemption count;
receive, from a consumer computing device, a first location data of a consumer;
receive, from the consumer computing device, a search query for products or services and a consumer purchase intent signal, the consumer purchase intent signal comprising at least one of: a user-submitted preference, a demographic factor, a user birthday, and a previous offer redemption;
query the search query for products or services to a merchant database to identify a relevant merchant;
compare the first location data of the consumer against location data of an offer, the location data of the offer comprising an offer radius;
identify a matching offer of the relevant merchant that matches the consumer purchase intent signal and the location data of the consumer;
transmit, to the consumer computing device, a query result comprising an identity of the relevant merchant with the matching offer;
compare a second location data of the consumer against a redemption radius;
determine if the consumer is within the redemption radius;
if the consumer is within the redemption radius, directing the consumer computing device to display a redemption code entry field;

if the consumer is not within the redemption radius, restricting the consumer from redeeming the matching offer;

receive a selection by the consumer to redeem the matching offer;

receive a redemption confirmation for the consumer indicating that the consumer redeemed the matching offer.

\* \* \* \* \*